US011760000B2

(12) United States Patent
Bala et al.

(10) Patent No.: US 11,760,000 B2
(45) Date of Patent: Sep. 19, 2023

(54) CHARACTERIZING MENISCUS BEHAVIOR IN 3D LIQUID METAL PRINTING

(71) Applicant: XEROX CORPORATION, Norwalk, CT (US)

(72) Inventors: Raja Bala, Pittsford, NY (US); Vijay Kumar Baikampady Gopalkrishna, Santa Clara, CA (US); Palghat Ramesh, Pittsford, NY (US); David Allen Mantell, Rochester, NY (US); Peter Michael Gulvin, Webster, NY (US); Mark A. Cellura, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 245 days.

(21) Appl. No.: 17/314,933

(22) Filed: May 7, 2021

(65) Prior Publication Data

US 2022/0355535 A1   Nov. 10, 2022

(51) Int. Cl.
*B33Y 50/02* (2015.01)
*B29C 64/112* (2017.01)
*G06T 7/00* (2017.01)
*B29C 64/209* (2017.01)
*G06T 7/64* (2017.01)
*B29C 64/393* (2017.01)
*B33Y 10/00* (2015.01)

(52) U.S. Cl.
CPC .......... *B29C 64/112* (2017.08); *B29C 64/209* (2017.08); *B29C 64/393* (2017.08); *G06T 7/0004* (2013.01); *G06T 7/64* (2017.01); *B33Y 10/00* (2014.12); *B33Y 50/02* (2014.12); *G06T 2207/30144* (2013.01)

(58) Field of Classification Search
CPC .......... B22F 10/22; B22F 12/53; B22F 12/90; B29C 64/112; B29C 64/209; B29C 64/393; B33Y 10/00; B33Y 50/02; G06T 2207/30144; G06T 7/0004; G06T 7/64
See application file for complete search history.

(56) References Cited

U.S. PATENT DOCUMENTS

| 2,658,997 | A | * | 11/1953 | Carbrey | .............. H04B 7/17 327/180 |
|---|---|---|---|---|---|
| 2013/0287934 | A1 | | 10/2013 | Ramsundar | |
| 2015/0165683 | A1 | | 6/2015 | Cheverton et al. | |
| 2021/0379664 | A1 | * | 12/2021 | Gibson | .............. B08B 1/04 |
| 2022/0219381 | A1 | | 7/2022 | Cormier et al. | |

OTHER PUBLICATIONS

"Automated object tracking, event detection, and recognition for high-speed video of drop formation phenomena" from "AIChE Journal 2021"; Feb. 2, 2021 (Year: 2021).*

(Continued)

*Primary Examiner* — Yuhui R Pan
(74) *Attorney, Agent, or Firm* — MH2 Technology Law Group LLP (57) ABSTRACT

A method includes capturing a video of a plurality of drops being jetted through a nozzle of a printer. The method also includes measuring a signal proximate to the nozzle based at least partially upon the video. The method also includes determining one or more metrics that characterize a behavior of the drops based at least partially upon the signal.

21 Claims, 8 Drawing Sheets

(56) References Cited

OTHER PUBLICATIONS

Kye-Si Kwon "Waveform Design Methods for Piezo Inkjet Dispensers Based on Measured Meniscus Motion" from "Journal of Microelectromechanical Systems, vol. 18, No. 5, Oct. 2009" (Year: 2009).*

Author Unknown, "JetXpert Drop Analysis," downloaded on Apr. 8, 2021 from ImageXpert, https://imagexpert.com/drop-analysis/, date unknown, 4 pages.

* cited by examiner

CHARACTERIZING MENISCUS BEHAVIOR IN 3D LIQUID METAL PRINTING

TECHNICAL FIELD

The present teachings relate generally to three-dimensional (3D) printing and, more particularly, to characterizing the behavior of the meniscus of liquid metal when the liquid metal is in a nozzle of the 3D printer.

BACKGROUND

A 3D printer builds (e.g., prints) a 3D object from a computer-aided design (CAD) model, usually by successively depositing material layer upon layer. For example, a first layer may be deposited upon a substrate, and then a second layer may be deposited upon the first layer. One particular type of 3D printer is a magnetohydrodynamic (MHD) printer, which is suitable for depositing liquid metal layer upon layer to form a 3D metallic object. Magnetohydrodynamic refers to the study of the magnetic properties and the behavior of electrically conducting fluids.

In a MHD printer, an electrical current flows through a metal coil, which produces time-varying magnetic fields that induce eddy currents within a reservoir of liquid metal compositions. Coupling between magnetic and electric fields within the liquid metal results in Lorentz forces that cause drops of the liquid metal to be ejected (also referred to as jetted) through a nozzle of the printer. The nozzle may be controlled to select the size and shape of the drops. The drops land upon the substrate and/or the previously deposited drops to cause the object to grow in size.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method is disclosed. The method includes capturing an image, a video, or both of a plurality of drops being jetted through a nozzle of a printer. The method also includes measuring a signal proximate to the nozzle based at least partially upon the image, the video, or both. The method also includes determining one or more metrics that characterize a behavior of the drops based at least partially upon the signal.

A method for printing is also disclosed. The method includes capturing a video of a plurality of drops being jetted through a nozzle of a printer. The method also includes determining a spatiotemporal variance (STV) signal proximate to a location of the nozzle in the video. The method also includes determining a plurality of pulse periods based at least partially upon the STV signal. Each pulse period includes a portion of the STV signal between two consecutive drops of the plurality of drops. The method also includes generating a pulse-averaged signal based at least partially upon the plurality of pulse periods. The method also includes generating an amplitude envelope based at least partially upon the pulse-averaged signal. The method also includes generating a meniscus carrier signal based at least partially upon the pulse-averaged signal, the amplitude envelope, or both. The method also includes determining a meniscus oscillation frequency of the drops in the nozzle based at least partially upon the meniscus carrier signal.

A method for characterizing a behavior of a plurality of drops of a liquid while the drops are positioned at least partially within a nozzle of a printer is also disclosed. The method includes capturing a video of the plurality of drops of the liquid being jetted through the nozzle of the printer. The method also includes determining a location of the nozzle in the video. The method also includes determining a spatiotemporal variance (STV) signal at the location of the nozzle in the video. The method also includes determining when the drops are jetted through the nozzle by identifying a neighboring location proximate to the location of the nozzle, determining a second STV signal at the neighboring location, and determining that the drops are jetted through the nozzle in response to increases in the second STV signal, which indicates that the drops have been jetted through the nozzle and are passing through the neighboring location. The method also includes determining a plurality of pulse periods based at least partially upon the determination of when the drops are jetted through the nozzle. Each pulse period includes a portion of the STV signal between two consecutive drops of the plurality of drops. The method also includes generating a pulse-averaged signal by aligning and averaging the plurality of pulse periods. The method also includes generating an amplitude envelope by moving a sliding temporal window over the pulse-averaged signal. The amplitude envelope includes a difference between local maxima and minima over the sliding temporal window. The method also includes generating a meniscus carrier signal by normalizing the pulse-averaged signal to zero mean to produce a normalized pulse-averaged signal, and dividing the normalized pulse-averaged signal by the envelope amplitude to generate the meniscus carrier signal. The meniscus carrier signal is in a time domain. The method also includes determining a meniscus oscillation frequency of menisci on lower surfaces of the drops when the drops are positioned at least partially in the nozzle by converting the meniscus carrier signal from the time domain to a frequency domain, and locating a peak of the meniscus carrier signal in the frequency domain. The method also includes adjusting a parameter of the printer based at least partially upon the meniscus oscillation frequency.

A 3D printer is also disclosed. The 3D printer includes a nozzle. The 3D printer also includes a camera configured to capture an image, a video, or both of a plurality of drops of liquid metal being jetted through the nozzle. The 3D printer also includes a computing system configured to measure a signal proximate to the nozzle based at least partially upon the image, the video, or both. The computing system is also configured to determine one or more metrics that characterize a behavior of the drops based at least partially upon the signal.

A 3D printer configured to print a 3D object is also disclosed. The 3D printer includes a nozzle. The 3D printer also includes a camera configured to capture a video of a plurality of drops of liquid metal being jetted through the nozzle. The 3D printer also includes a computing system configured to determine a spatiotemporal variance (STV) signal at a location of the nozzle in the video. The computing system is also configured to determine a plurality of pulse periods based at least partially upon the STV signal. Each pulse period includes a portion of the STV signal between two consecutive drops of the plurality of drops. The computing system is also configured to generate a pulse-averaged signal based at least partially upon the plurality of pulse periods. The computing system is also configured to generate an amplitude envelope based at least partially upon the pulse-averaged signal. The computing system is also configured to generate a meniscus carrier signal based at least partially upon the pulse-averaged signal, the amplitude envelope, or both. The computing system is also configured to determine a meniscus oscillation frequency of the drops in the nozzle based at least partially upon the meniscus carrier signal.

A 3D printer configured to print a 3D object by jetting a plurality of drops of liquid metal of onto a substrate is also disclosed. The 3D printer includes an ejector having a nozzle. The 3D printer also includes a heating element configured to heat a solid metal within the ejector, thereby converting the solid metal to the liquid metal. The 3D printer also includes a coil wrapped at least partially around the ejector. The 3D printer also includes a power source configured to transmit voltage pulses to the coil. The coil causes the plurality of drops of the liquid metal to be jetted through the nozzle in response to the voltage pulses. The 3D printer also includes a camera configured to capture a video of the drops being jetted through the nozzle. The 3D printer also includes a light source configured to illuminate the nozzle and the drops as the video is captured. The 3D printer also includes a computing system configured to determine a location of the nozzle in the video. The computing system is also configured to determine a spatiotemporal variance (STV) signal at the location of the nozzle in the video. The computing system is also configured to determine when the drops are jetted through the nozzle by identifying a neighboring location proximate to the location of the nozzle, determining a second STV signal at the neighboring location, and determining that the drops are jetted through the nozzle in response to increases in the second STV signal, which indicates that the drops have been jetted through the nozzle and are passing through the neighboring location. The computing system is also configured to determine a plurality of pulse periods based at least partially upon the determination of when the drops are jetted through the nozzle. Each pulse period includes a portion of the STV signal between two consecutive drops of the plurality of drops. The computing system is also configured to generate a pulse-averaged signal by aligning and averaging the plurality of pulse periods. The computing system is also configured to generate an amplitude envelope by moving a sliding temporal window over the pulse-averaged signal. The amplitude envelope includes a difference between local maxima and minima over the sliding temporal window. The computing system is also configured to generate a meniscus carrier signal by normalizing the pulse-averaged signal to zero mean to produce a normalized pulse-averaged signal, and dividing the normalized pulse-averaged signal by the envelope amplitude to generate the meniscus carrier signal. The meniscus carrier signal is in a time domain. The computing system is also configured to determine a meniscus oscillation frequency of menisci on lower surfaces of the drops positioned at least partially within in the nozzle by converting the meniscus carrier signal from the time domain to a frequency domain, and locating a peak of the meniscus carrier signal in the frequency domain. The computing system is also configured to adjust a parameter of the 3D printer based at least partially upon the meniscus oscillation frequency.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

During 3D printing with a liquid metal, the liquid metal is separated into individual drops within a nozzle of the 3D printer, and the drops are jetted (also referred to as ejected) one by one in a discrete manner. The lower surface of a drop may have a meniscus while the drop is positioned at least partially in the nozzle (e.g., just prior to being jetted). The behavior of the meniscus may provide information about the internal characteristics of the inside the 3D printer (e.g., the nozzle) that affect the properties of the jetting and/or properties of the printed 3D metallic object formed by the drops. Thus, the present disclosure is directed to characterizing the meniscus of the (e.g., lower surface) drops while the drops are positioned at least partially within the nozzle.

In order for the drops to be consistent in form and motion, the meniscus oscillation after one drop is jetted through the nozzle may decay rapidly and acquiesce before the next drop is jetted. In one embodiment, the meniscus behavior may be characterized by capturing high-speed videos of the nozzle during printing, and performing visual assessment of the surface behavior of the meniscus between jettings. In another embodiment, the characterization of the meniscus behavior may be automated. For example, the meniscus behavior may be quantified using video analysis and/or by machine learning (ML) to the high-speed videos.

Figure 1:
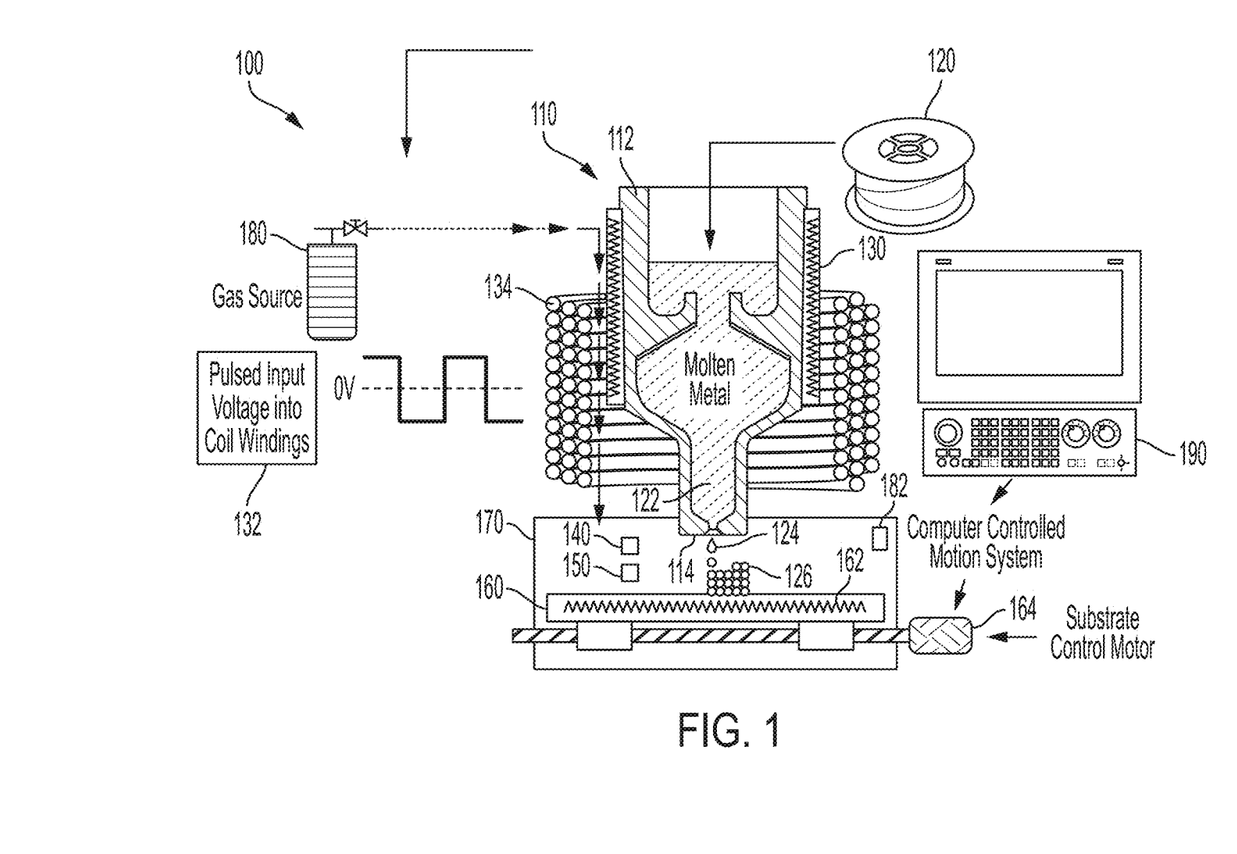
FIG. 1 depicts a schematic cross-sectional view of a 3D printer, according to an embodiment.

FIG. 1 depicts a schematic cross-sectional view of a 3D printer 100, according to an embodiment. The 3D printer 100 may include an ejector (also referred to as a pump chamber) 110. The ejector 110 may define an inner volume that is configured to receive a printing material 120. The printing material 120 may be or include a metal, a polymer, or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorenz force. The Lorenz force creates a pressure at an inlet of a nozzle 114 of the ejector 110. The pressure causes the liquid metal 122 to be jetted through the nozzle 114 in the form of one or more drops 124.

The 3D printer 100 may also include one or more cameras (one is shown: 140) that is/are configured to capture video and/or images of the nozzle 114, the drops 124, or both. In one embodiment, the video may include signals derived from a sequence of images. In another embodiment, the images may be or include frames of the video. In one particular example, a strobe construction of the jetting may be achieved by capturing a plurality of individual images/frames with different time delays from multiple drop ejections. The camera 140 may be or include a high-speed camera that is configured to capture the images and/or video at a rate of from about 2,000 frames per second to about 50,000 frames per second or about 10,000 frames per second to about 30,000 frames per second (e.g., 19,000 frames per second). In one example, the jetting may occur at a frequency from about 100 Hz to about 1000 Hz, and the camera 140 may operate at a frequency from about 10,000 frames per second to about 50,000 frames per second. In one embodiment, front face monitoring during the jetting of the drops may be triggered by the 3D printer 100 as a normal checkup, operator intervention, detection of irregular jetting, and/or by detection of greater than usual deviations of the 3D printer 100.

The 3D printer 100 may also include one or more light sources (one is shown: 150) that is/are configured to shine light on the nozzle 114, the drops 124, or both. The light source 150 may be or include a fiber optic light source. The light source 150 may be or include a collimated light source. The light source 150 may be or include a white light source.

The 3D printer 100 may also include a substrate (also referred to as a build plate) 160 that is positioned below the nozzle 114. The drops 124 that are jetted through the nozzle 114 may land on the substrate 160 and cool and solidify to produce a 3D object 126. The substrate 160 may include a heater 162 therein that is configured to increase the temperate of the substrate 160. The 3D printer 100 may also include a substrate control motor 164 that is configured to move the substrate 160 as the drops 124 are being jetted (i.e., during the printing process) to cause the 3D object 126 to have the desired shape and size. The substrate control motor 164 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead be configured to move in one, two, or three dimensions.

In one embodiment, the 3D printer 100 may also include an enclosure 170. The enclosure 170 may be positioned at least partially around the ejector 110, the nozzle 114, the drops 124, the 3D object 126, the heating elements 130, the coils 134, the camera 140, the light source 150, the substrate 160, or a combination thereof. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printer 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the drops 124, the 3D object 126, and/or the substrate 160.

The 3D printer 100 may also include a gas sensor 182. The gas sensor 182 may be positioned within the enclosure 170. The gas sensor 182 may also or instead be positioned proximate to the drops 124, the 3D object 126, and/or the substrate 160 (e.g., in an embodiment where the enclosure 170 is omitted). The gas sensor 182 may be configured to measure a concentration of the gas, oxygen, or a combination thereof.

The 3D printer 100 may also include a computing system 190. The computing system 190 may be configured to control the introduction of the printing material 120 into the ejector 110, the heating elements 130, the power source 132, the camera 140, the light source 150, the substrate control motor 164, the gas source 180, the gas sensor 182, or a combination thereof. For example, the computing system 190 may be configured to receive the images and/or video from the camera 140 and to characterize the behavior of the meniscus on the lower surface of the drops 124 while the drops are positioned at least partially within the nozzle 114. The computing system 190 may also be configured to adjust one or more parameters of the 3D printer based at least partially upon the behavior of the meniscus. The behavior of the meniscus and/or the adjustment of the parameters may be part of a real-time closed loop control system provided by the computing system 190.

Figure 2:
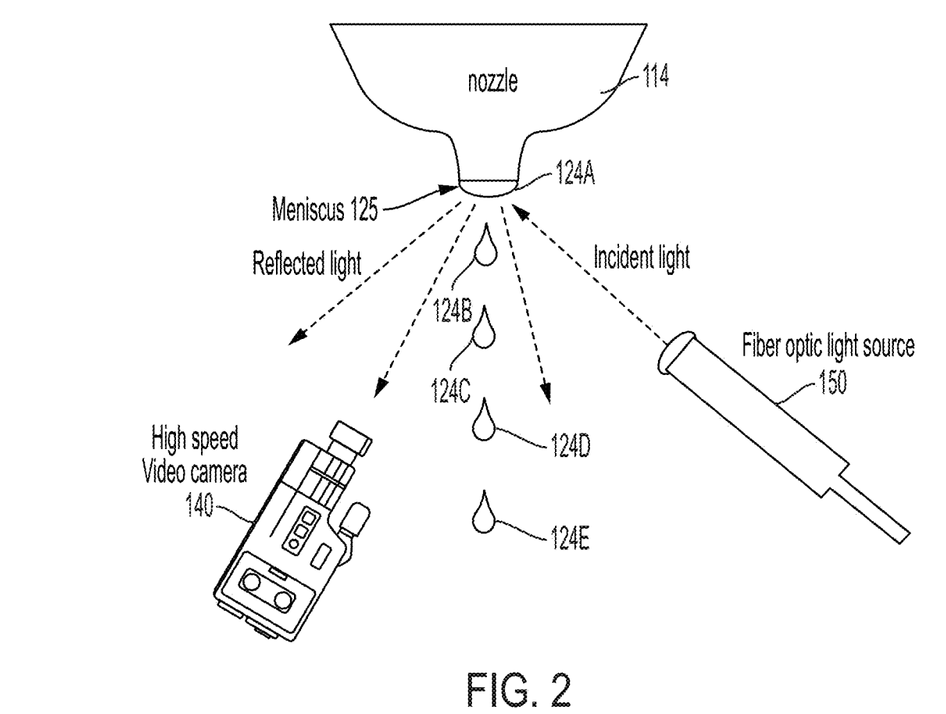
FIG. 2 depicts a side view of a portion of FIG. 1, according to an embodiment.

FIG. 2 depicts a side view of a portion of FIG. 1, according to an embodiment. More particularly, FIG. 2 depicts a side view of the nozzle 114, the camera 140, and the light source 150. In FIG. 2, five drops 124A-124E of the liquid printing material 120 are shown. The drop 124A is positioned at least partially within the nozzle 114, and the drops 124B-124E have already been jetted from the nozzle 114 and are descending toward the substrate 160 (not shown in FIG. 2).

The camera 140 and/or the light source 150 may be directed at/toward at least a portion of the liquid printing material 120 that is positioned at least partially within the nozzle 114. Said another way, the camera 140 and/or the light source 150 may be directed at/toward at one of the drops 124A that is positioned at least partially within the nozzle 114 (e.g., before the drop 124A has been jetted from the nozzle 114). More particularly, the camera 140 and/or the light source 150 may be directed at/toward a meniscus 125 of the liquid printing material 120 (e.g., drop 124A) that is positioned at least partially within the nozzle 114. The meniscus 125 refers to the convex and/or crescent shape of the lower surface of the liquid printing material 120 (e.g., drop 124A). In the embodiment shown, the meniscus 125 is at least partially outside (e.g., below) the lower end of the nozzle 114. In another embodiment (not shown), the meniscus 125 may be at least partially or fully inside/within the nozzle 114, such that the lowermost part of the liquid printing material 120 (or drop 124A) would not be seen in the side view of FIG. 2.

Figure 3:
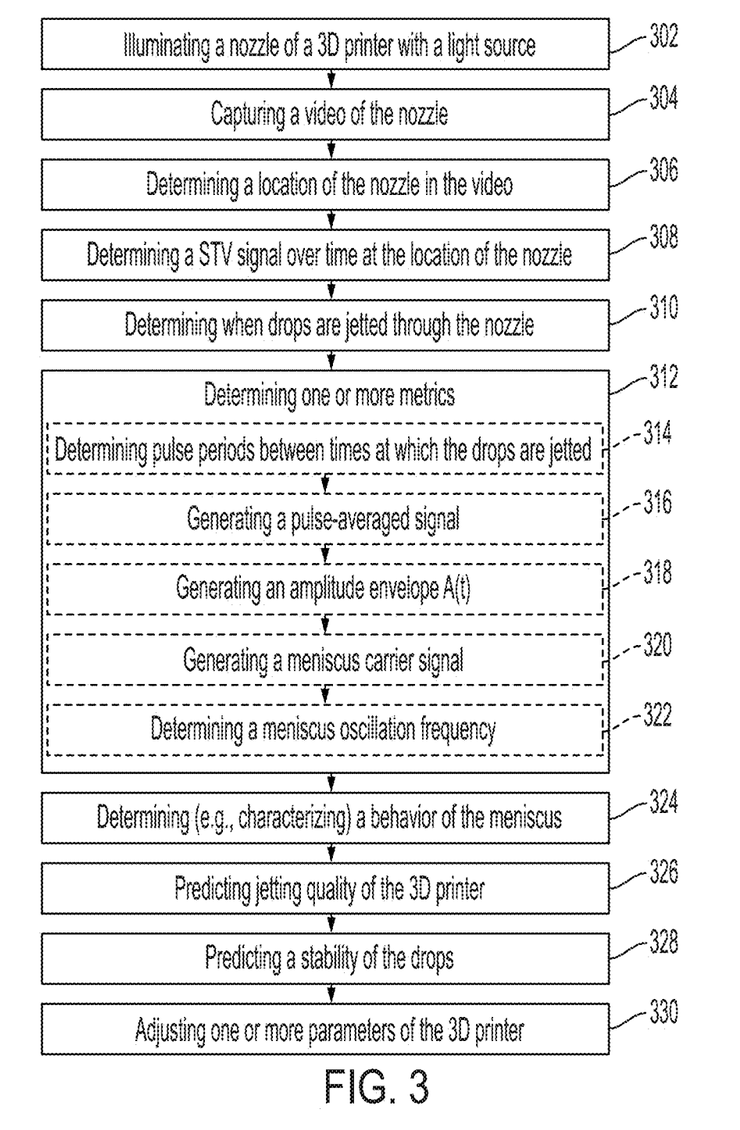
FIG. 3 depicts a flowchart of a method for printing a 3D object, according to an embodiment.

FIG. 3 depicts a flowchart of a method 300 for printing the 3D object 126, according to an embodiment. More particularly, the method 300 may characterize a behavior of the meniscus 125 of the liquid printing material 120 (e.g., the drop 124A) when the drop 124A is positioned at least partially within the nozzle 114. The method 300 is particularly applicable to liquid metal drops 124A-124E in 3D printing applications (as opposed to non-metal drops and/or non 3D printing applications) because metallic drops produce specular highlights, and analysis of these specular highlights provided by the method 300 may provide information and insight into the oscillation of the liquid metal surface (e.g., the meniscus 125) of the drop 124A. The behavior (e.g., oscillation) of the meniscus 125 may be directly related to the stability of the drop 124A, which in turn affects the quality of the 3D object 126.

An illustrative order of the method 300 is provided below; however, one or more steps of the method 300 may be performed in a different order, performed simultaneously, repeated, or omitted. One or more steps of the method 300 may be performed (e.g., automatically) by the computing system 190.

The method 300 may include illuminating the nozzle 114 with the light source 150, as at 302. This may include illuminating the liquid printing material 120 (e.g., drop 124A) positioned at least partially within the nozzle 114. For example, this may include illuminating the meniscus 125 of the liquid printing material 120 (e.g., drop 124A) positioned at least partially within the nozzle 114.

The method 300 may also include capturing a video of the nozzle 114, as at 304. This may include capturing a video of the liquid printing material 120 (e.g., drop 124A) positioned at least partially within the nozzle 114. For example, this may include capturing a video of the meniscus 125 of the liquid printing material 120 (e.g., drop 124A) positioned at least partially within the nozzle 114. This step may also include capturing a video of the drop 124A as the drop 124A descends from the nozzle 114 (e.g., to the substrate 160). As mentioned above, as used herein, a video may include a plurality of images. Thus, this step may also or instead include capturing a plurality of images of the nozzle 114.

Figure 4:
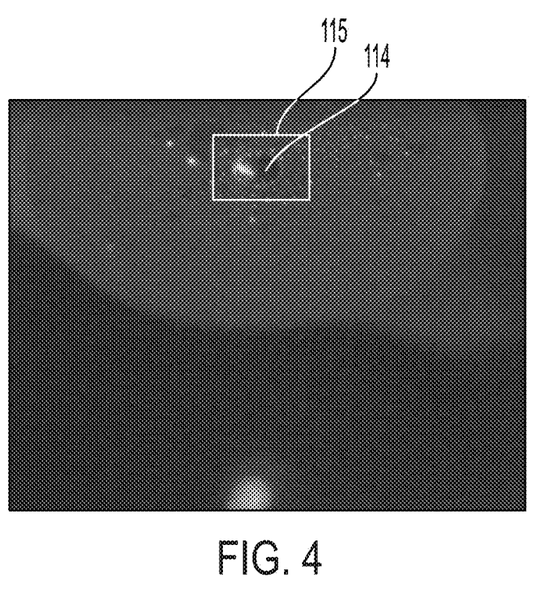
FIG. 4 depicts a frame (e.g., an image) from a video that identifies a location of a nozzle of the 3D printer, according to an embodiment.

The method 300 may also include determining a location 115 of the nozzle 114 in the video, as at 306. The location 115 of the nozzle 114 may be determined by the computing system 190 based at least partially upon the video. FIG. 4 depicts a frame (e.g., an image) 400 from the video that identifies the location 115 of the nozzle 114, according to an embodiment. For each x-y location in the video, a 3D window may be positioned (e.g., centered) around that location, and the 3D window may be run over a temporal dimension in a sliding fashion. A spatiotemporal variance (STV) may be determined over time proximate to the nozzle 114. The minimum STV value may be identified and may be an indicator of drop-induced motion at that spatial location, denoted $V_{xy}$. This process may be repeated over the two spatial dimensions x-y, and the x-y location that maximizes $V_{xy}$ may be determined to be the location 115 of the nozzle 114. The location 115 may be a 2D or 3D box. One or more of the following steps of the method 300 may be performed within the location 115 (e.g., the box representing the nozzle region). The location 115 may also be referred to as the region of interest (ROI).

The geometry of the 3D surface of the meniscus 125 may be difficult to measure precisely; however, the behavior (e.g., movement, motion, etc.) of the meniscus 125 may manifest itself in the video in terms of a spatiotemporal pattern of specular highlights. As used herein, "specular highlights" refer to the phenomenon of light reflecting off of the front surface of the liquid (e.g., the drop 124A). More particularly, the specular highlight(s) may move as the meniscus 125 moves, and the movement of the specular highlight(s) may be used to determine or infer the characteristics of the (movement of the) meniscus 125. Thus, once the location 115 of the nozzle 114 has been determined, the method 300 may also include determining (e.g., measuring and/or plotting) a STV signal over time at the location 115 of the nozzle 114, as at 308. The STV signal may be determined by the computing system 190 based at least partially upon the video (e.g., using a spatiotemporal variance-guided filter (SVGF)). As described below, the STV signal may be used to determine the behavior of the meniscus 125 over time.

Figure 5:
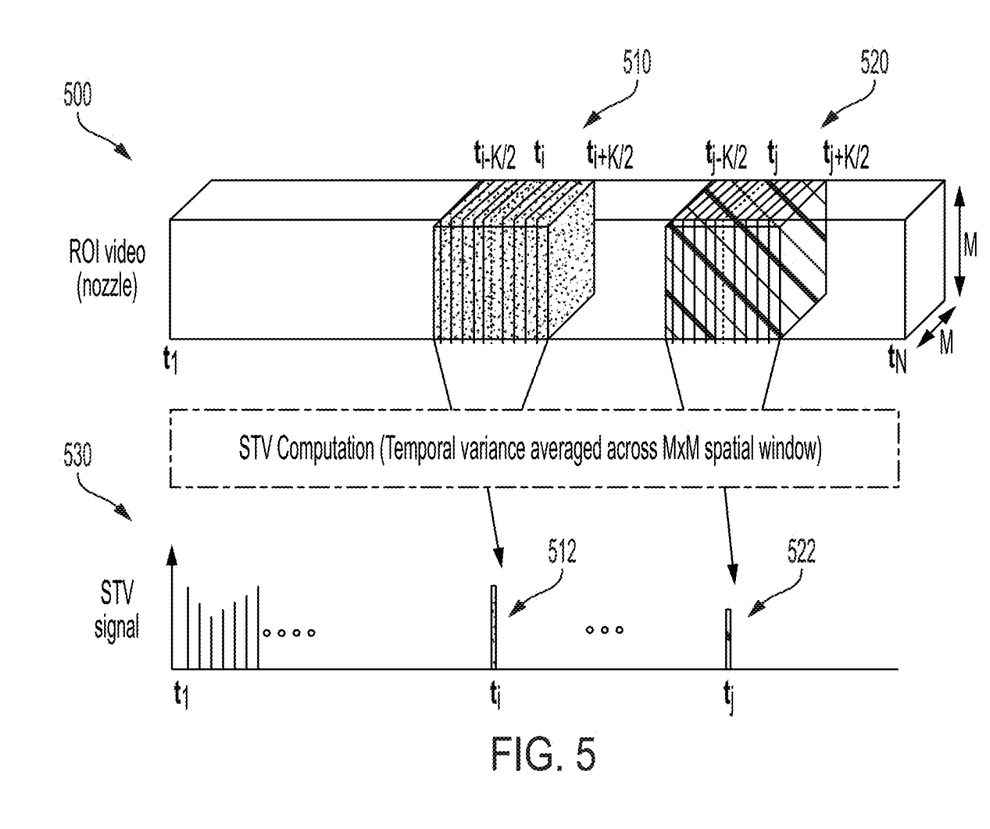
FIG. 5 depicts a schematic view of an example of a 3D view of the video of the nozzle, according to an embodiment.

FIG. 5 depicts a schematic view of an example of a 3D view of the video 500 of the nozzle 114, according to an embodiment. The video 500 is plotted as a temporal waveform. The STV signal may be measured within a window within the video 500. For example, the STV signal may be measured within an M×M×K spatiotemporal window within the video 500, where M is the spatial extent in pixels, and K is the number of frames. In one embodiment, the STV signal may be determined as the variance of pixels computed over time at one or more M×M fixed spatial locations (e.g., locations 510, 520), and then the average of these variances at the M×M fixed spatial locations 510, 520 may be determined to obtain an average STV signal for the 3D block. Below the 3D view of the video 500 is the STV signal 530, which includes the average 512 of the M×M fixed spatial location 510 and the average 522 of the M×M fixed spatial location 520.

Figure 6:
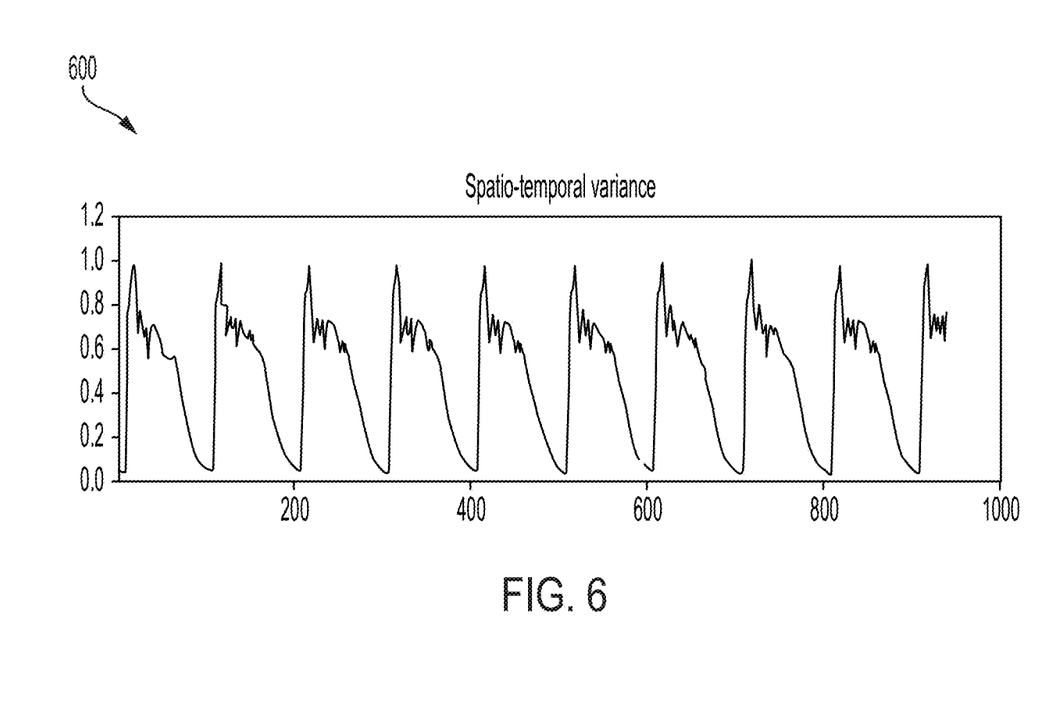
FIG. 6 depicts a graph of an example STV signal (i.e., waveform) over time at the location of the nozzle, according to an embodiment.

FIG. 6 depicts a graph 600 of an example STV signal (i.e., waveform) 610 over time at the location 115 of the nozzle 114, according to an embodiment. In the graph 600, the X axis represents the temporal frame index, and the Y axis represents the computed STV.

The method 300 may also include determining when the drops 124A-124E are jetted through the nozzle 114, as at 310. To accomplish this, one or more neighboring locations, proximate to the location 115 of the nozzle 114, may be searched, and the neighboring location with the largest STV may be determined to be the one through which the drops 124A-124EW pass after being jetted through the nozzle 114. Increases in the STV signal in this neighboring location 116 may identify the jetting of the drops 124A-124E (i.e., the drop ejections).

Figure 7:
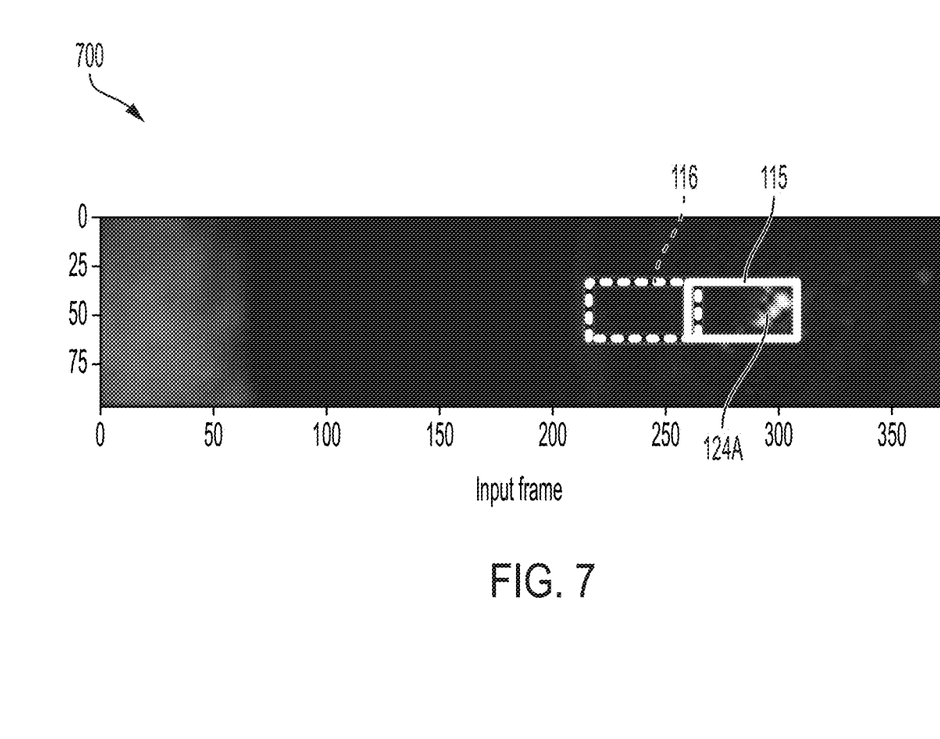
FIG. 7 depicts a frame (e.g., an image) from the video, according to an embodiment.

FIG. 7 depicts a frame (e.g., an image) 700 from the video 500, according to an embodiment. In the image 700, the location 115 and the neighboring location 116 are shown. For example, in FIG. 7, the right side of the image 700 represents up, the left side of the image 700 represents down, and the drop 124A is moving from right/up to left/down. Referring to FIGS. 6 and 7, it may be seen that the meniscus 125 of the drop 124A reaches a predetermined (e.g., low) steady state level (i.e., a desirable level) before the next drop is jetted. As used herein, the predetermined steady state level is less than about 30%, less than about 20%, or less than about 10% of the maximum STV within the pulse period.

The method 300 may also include determining one or more metrics based at least partially upon the STV signal, as at 312. The metrics may be used to characterize the (e.g., aggregate) behavior of the meniscus 125 over the temporal duration of the video 500. Thus, determining the metrics may include determining pulse periods (four pulse periods are shown: 811-814) between times at which the drops 124A-124E are jetted (three times are shown 821-823), as at 314. This determination may be made based at least partially upon the STV signal. This is shown in the graph 810 in FIG. 8.

Determining the one or more metrics may also include generating a pulse-averaged signal (i.e., waveform) based at least partially upon the pulse periods, as at 316. The pulse-averaged signal is shown in the graph 830 in FIG. 8. Generating the pulse-averaged signal may include aligning the STV signal in the pulse periods 811-814 and/or averaging the STV signal in the pulse periods 811-814.

Determining the one or more metrics may also include generating an amplitude envelope A(t) based at least partially upon the pulse-averaged signal, as at 318. As used herein, the "amplitude envelope" refers to the difference between local maxima and local minima over a sliding temporal window. This envelope may yield information about the decay rate and time taken for the meniscus 125 to reach a "quiet" steady state. The amplitude envelope is shown in the graph 840 in FIG. 8. Generating the amplitude envelope may include moving a sliding temporal window over the pulse-averaged signal. The amplitude envelope may be a difference between local maxima and minima over the sliding temporal window. The amplitude envelope may yield information about an amount of time and/or a decay rate for the meniscus 125 to reach a quiet steady state.

Determining the one or more metrics may also include generating a meniscus carrier signal based at least partially upon the pulse-averaged signal (in graph 830) and the amplitude envelope (in graph 840), as at 320. The meniscus carrier signal is shown in the graph 850 in FIG. 8. Generating the meniscus carrier signal may include normalizing the pulse-averaged signal to zero mean to produce a normalized pulse-average signal, and then dividing the normalized pulse-average signal by the envelope amplitude. The meniscus carrier signal may be in the time domain.

Determining the one or more metrics may also include determining a meniscus oscillation frequency based at least partially upon the meniscus carrier signal, as at 322. The meniscus oscillation frequency is shown in the graph 860 in FIG. 8. The meniscus oscillation frequency may be determined by locating a peak in a Fourier Transform of the meniscus carrier signal. As shown in the graph 860, the peak amplitude occurs at about 600 Hz oscillation.

Figure 8:
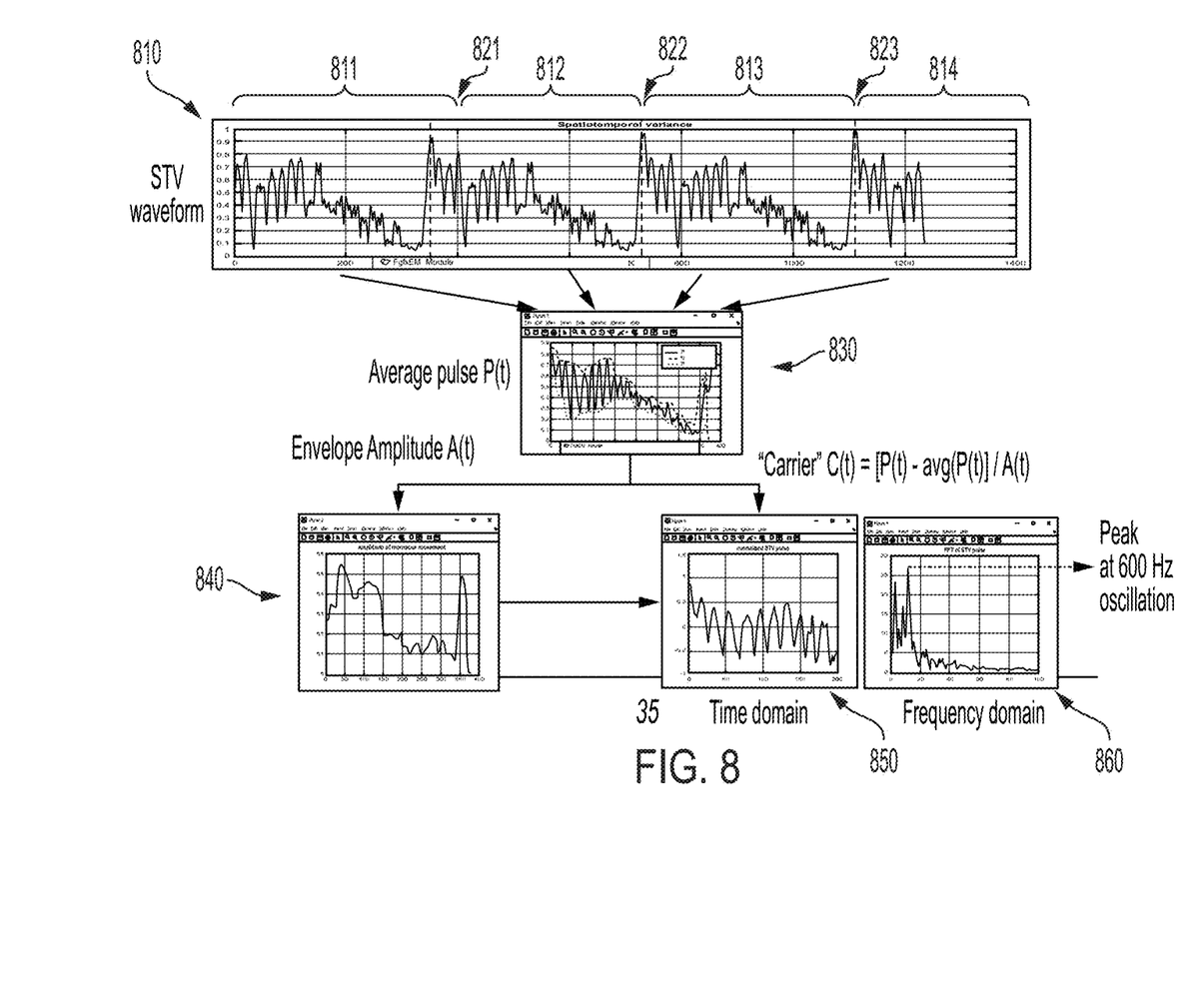
FIG. 8 illustrates a STV waveform, a pulse-averaged signal, an envelope amplitude signal, a meniscus carrier signal in the time domain, and a meniscus oscillation frequency in the frequency domain, according to an embodiment.

The method 300 may also include determining (e.g., characterizing) a behavior of the meniscus 125, as at 324. The behavior may be determined/characterized based at least partially upon the metrics (e.g., the characteristics of the pulse STV waveform). More particularly, the behavior may be determined/characterized based at least partially upon the pulse periods (in graph 810), the pulse-averaged signal (in graph 830), the envelope amplitude (in graph 840), the meniscus carrier signal (in graph 850), the meniscus oscillation frequency (in graph 860), or a combination thereof. In one embodiment, determining/characterizing may include quantifying the behavior of the meniscus 125. This may yield a more objective assessment of the meniscus 125 in comparison to conventional visual inspection of the video.

For example, the behavior of the meniscus may be determined to be optimal when the meniscus oscillation frequency (in graph 860) is in a first range, and the behavior of the meniscus may be determined to be sub-optimal when the meniscus oscillation frequency (in graph 860) is in a second range. The first range may be from about 500 Hz to about 2 kHz or from about 1 kHz to about 1.5 kHz. The second range may be above and/or below the first range. The oscillation may be a combination of transverse and surface waves.

In at least one embodiment, the method 300 may also include predicting jetting quality of the 3D printer 100, as at 326. The jetting quality may be predicted using a machine learning (ML) algorithm. The ML algorithm may be trained using features extracted from the video 500. The features may be or include the pulse periods (in graph 810), the pulse-averaged signal (in graph 830), the envelope amplitude (in graph 840), the meniscus carrier signal (in graph 850), the meniscus oscillation frequency (in graph 860), or a combination thereof. The features may also or instead include a principal component analysis (PCA) on the pulse-averaged signal (in graph 830), a carrier frequency of the STV signal, a pulse-to-pulse covariance of the STV signal, a pulse-to-pulse correlation of the STV signal, a mean and/or max of the pulse-averaged signal (in graph 830), a decay of the STV signal within each pulse period 811-814, or a combination thereof. The ML algorithm may also be trained by labeling ground truths that indicate the quality of jetting. The ground truths may be labelled by a user. In one example, three quality labels may be used: good, overactive, and hyperactive. As used in this context, "good" refers to the meniscus amplitude decaying monotonically between pulses, and the behavior is repeatable from pulse to pulse, "overactive" refers to the meniscus oscillation having a high amplitude in between pulses, and the behavior is generally repeatable from pulse to pulse, and "hyperactive" refers to the meniscus oscillation having a high amplitude in between pulses, and the behavior is not repeatable from pulse to pulse.

In one embodiment, the features and quality labels from the training set are provided to a Random Forest (RF) classifier to predict a quality class. In one example, a "quality class" refers to one of good, overactive, and hyperactive. The RF classifier may include a plurality of trees (e.g., 300 trees). A test configuration that provided good results used the following features: the carrier frequency of the STV signal, the pulse-to-pulse covariance of the STV signal, the mean and/or max of the pulse-averaged signal (in graph 830), and the decay of the STV signal within each pulse period 811-814. This resulted in a prediction accuracy of 86% on one test. It was observed that confusion was greatest between "good" and "overactive" classes.

In one embodiment, the method 300 may also include predicting a stability of the drops 124A-124E, as at 328. Drop stability refers to the consistency between drops 124A-124E in a continuous jetting mode. Drop stability may be quantified on a scale from 1 (poor) to 4 (excellent) (e.g., based on visual assessment of strobe videos of the drops 124A-124E). The RF classifier may be trained using one or more of features mentioned above that are used to train the ML algorithm. In one test, using a random forest classifier with 100 trees, a prediction accuracy of 60% was achieved.

The steps 326, 328 may also or instead use other variants of ML algorithms (e.g., support vector machine, artificial neural network, etc.) and/or additional features (e.g., autocorrelation of waveform, and features automatically learned from the data using a deep neural network).

The method 300 may also include adjusting one or more parameters of the 3D printer 100, as at 330. The parameters may be adjusted based at least partially upon the one or more metrics (e.g., the pulse periods (in graph 810), the pulse-averaged signal (in graph 830), the envelope amplitude (in graph 840), the meniscus carrier signal (in graph 850), the meniscus oscillation frequency (in graph 860), or a combination thereof). For example, the one or more parameters may be adjusted in response to the meniscus oscillation frequency being greater than a predetermined threshold (e.g., 1.5 kHz). In another example, the one or more parameters may be adjusted in response to a decay rate of the meniscus oscillation frequency being greater than or less than a predetermined rate.

The parameters to be adjusted may be or include power (e.g., voltage, current, frequency, pulse length, voltage vs time waveform, etc.) provided to the coils 134 by the power source 132. For example, if the behavior of the meniscus 125 is determined (at 324) to be overdriven, the power delivered to the coils 134 may be decreased. As used herein, "overdriven" means excess energy is being added to the liquid metal 122 in the ejector 110, which results in excess residual energy in the meniscus 125. The parameters may also or instead include the amount of heat generated by the heating elements 130, the temperature of the liquid printing material 120 (e.g., the drops 124A-124E), the size of the drops 124A-124E, the frequency at which the drops 124A-124E are ejected, or a combination thereof.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected.

Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method, comprising:
    capturing an image, a video, or both of a plurality of drops being jetted through a nozzle of a printer;
    measuring a signal proximate to the nozzle based at least partially upon the image, the video, or both;
    determining a meniscus oscillation frequency of the drops in the nozzle based at least partially upon the signal; and
    adjusting a parameter of the printer when the meniscus oscillation frequency is outside of a predetermined range.

2. The method of claim 1, wherein the signal comprises a spatiotemporal variance (STV) signal.

3. The method of claim 1, further comprising predicting a jetting quality of the printer based at least partially upon the meniscus oscillation frequency.

4. The method of claim 1, further comprising predicting a stability of the drops based at least partially upon the meniscus oscillation frequency.

5. The method of claim 1, wherein the parameter comprises a current, a voltage, a pulse length, a voltage versus time waveform, or a combination thereof provided to a coil of the printer that causes the drops to be jetted through the nozzle.

6. The method of claim 1, wherein the parameter comprises a frequency at which the drops are jetted through the nozzle.

7. The method of claim 1, further comprising determining a plurality of pulse periods based at least partially upon the signal, wherein each pulse period comprises a portion of the signal between two consecutive drops of the plurality of drops, and wherein the meniscus oscillation frequency is determined based at least partially upon the pulse periods.

8. The method of claim 1, further comprising generating a pulse-averaged signal based at least partially upon the signal, wherein the meniscus oscillation frequency is determined based at least partially upon the pulse-averaged signal.

9. The method of claim 1, further comprising generating an amplitude envelope based at least partially upon the signal, wherein the meniscus oscillation frequency is determined based at least partially upon the amplitude envelope.

10. The method of claim 1, further comprising generating a meniscus carrier signal based at least partially upon the signal, wherein the meniscus oscillation frequency is determined based at least partially upon the meniscus carrier signal.

11. The method of claim 1, wherein the predetermined range is from 500 Hz to 2 kHz.

12. The method of claim 1, wherein the predetermined range is from 1 kHz to 1.5 kHz.

13. A method for printing, the method comprising:
capturing a video of a plurality of drops being jetted through a nozzle of a printer;
determining a spatiotemporal variance (STV) signal proximate to a location of the nozzle in the video;
determining a plurality of pulse periods based at least partially upon the STV signal, wherein each pulse period comprises a portion of the STV signal between two consecutive drops of the plurality of drops;
generating a pulse-averaged signal based at least partially upon the plurality of pulse periods;
generating an amplitude envelope based at least partially upon the pulse-averaged signal;
generating a meniscus carrier signal based at least partially upon the pulse-averaged signal, the amplitude envelope, or both;
determining a meniscus oscillation frequency of the drops in the nozzle based at least partially upon the meniscus carrier signal; and
adjusting a parameter of the printer based at least partially upon the meniscus oscillation frequency.

14. The method of claim 13, wherein generating the amplitude envelope comprises moving a sliding temporal window over the pulse-averaged signal, and wherein the amplitude envelope comprises a difference between local maxima and minima over the sliding temporal window.

15. The method of claim 13, wherein generating the meniscus carrier signal comprises:
normalizing the pulse-averaged signal to zero mean to produce a normalized pulse-averaged signal; and
dividing the normalized pulse-averaged signal by the envelope amplitude to generate the meniscus carrier signal, wherein the meniscus carrier signal is in a time domain.

16. The method of claim 13, wherein determining the meniscus oscillation frequency comprises:
converting the meniscus carrier signal from a time domain to a frequency domain; and
locating a peak of the meniscus carrier signal in the frequency domain.

17. A method for characterizing a behavior of a plurality of drops of a liquid while the drops are positioned at least partially within a nozzle of a printer, the method comprising:
capturing a video of the plurality of drops of the liquid being jetted through the nozzle of the printer;
determining a location of the nozzle in the video;
determining a spatiotemporal variance (STV) signal at the location of the nozzle in the video;
determining when the drops are jetted through the nozzle by:
identifying a neighboring location proximate to the location of the nozzle;
determining a second STV signal at the neighboring location; and
determining that the drops are jetted through the nozzle in response to increases in the second STV signal, which indicates that the drops have been jetted through the nozzle and are passing through the neighboring location;
determining a plurality of pulse periods based at least partially upon the determination of when the drops are jetted through the nozzle, wherein each pulse period comprises a portion of the STV signal between two consecutive drops of the plurality of drops;
generating a pulse-averaged signal by aligning and averaging the plurality of pulse periods;
generating an amplitude envelope by moving a sliding temporal window over the pulse-averaged signal, wherein the amplitude envelope comprises a difference between local maxima and minima over the sliding temporal window;
generating a meniscus carrier signal by:
normalizing the pulse-averaged signal to zero mean to produce a normalized pulse-averaged signal; and
dividing the normalized pulse-averaged signal by the envelope amplitude to generate the meniscus carrier signal, wherein the meniscus carrier signal is in a time domain;
determining a meniscus oscillation frequency of menisci on lower surfaces of the drops when the drops are positioned at least partially in the nozzle by:
converting the meniscus carrier signal from the time domain to a frequency domain; and
locating a peak of the meniscus carrier signal in the frequency domain; and
adjusting a parameter of the printer based at least partially upon the meniscus oscillation frequency.

18. The method of claim 17, wherein the STV signal is determined within a M×M×K spatiotemporal window within the video, where M represents a spatial extent in pixels, and K represents a number of frames in the video.

19. The method of claim 17, wherein adjusting the parameter comprises adjusting a power provided to one or more coils of the printer, wherein the power being provided to the coils causes the drops to be jetted through the nozzle.

20. The method of claim 17, wherein adjusting the parameter comprises adjusting a frequency at which the drops are jetted through the nozzle.

21. The method of claim 17, wherein adjusting the parameter comprises adjusting a temperature of the liquid in the printer.

* * * * *